US009856814B2

(12) United States Patent
Odello et al.

(10) Patent No.: US 9,856,814 B2
(45) Date of Patent: Jan. 2, 2018

(54) SYSTEM FOR DETECTING A LEAKAGE IN AN INTAKE LINE OF AN INTERNAL COMBUSTION ENGINE

(71) Applicant: FPT Industrial S.P.A., Turin (IT)

(72) Inventors: Fabio Odello, Collegno (IT); Salvatore Musumeci, Augusta (IT); Francesco Dell'Unto, Turin (IT)

(73) Assignee: FPT INDUSTRIAL S.P.A., Turin (IT)

( * ) Notice: Subject to any disclaimer, the term of this patent is extended or adjusted under 35 U.S.C. 154(b) by 599 days.

(21) Appl. No.: 14/493,072

(22) Filed: Sep. 22, 2014

(65) Prior Publication Data
US 2015/0082771 A1    Mar. 26, 2015

(30) Foreign Application Priority Data

Sep. 24, 2013    (IT) .............................. MI2013A1571

(51) Int. Cl.
| | | |
|---|---|---|
| *F02D 41/22* | (2006.01) | |
| *F01N 13/00* | (2010.01) | |
| *F02D 41/00* | (2006.01) | |
| *F02D 41/18* | (2006.01) | |

(Continued)

(52) U.S. Cl.
CPC ........... *F02D 41/22* (2013.01); *F01N 13/008* (2013.01); *F02D 41/0052* (2013.01);
(Continued)

(58) Field of Classification Search
CPC .... F02M 26/49; F02M 2700/05; F02D 41/18; F02D 41/22; F02D 2200/04
See application file for complete search history.

(56) References Cited

U.S. PATENT DOCUMENTS

| | | | | |
|---|---|---|---|---|
| 4,989,562 A | * | 2/1991 | Ohkumo | ............... F02D 41/266 |
| | | | | 123/198 D |
| 5,946,906 A | * | 9/1999 | Akazaki | ................. F02M 26/15 |
| | | | | 60/276 |

(Continued)

FOREIGN PATENT DOCUMENTS

| | | | |
|---|---|---|---|
| WO | WO03029777 | 4/2003 | |
| WO | WO 2006114393 A1 * | 11/2006 | ............. F02D 41/22 |

OTHER PUBLICATIONS

European Patent Office, Office Action for European Application No. 14 185 935.5-1606, dated Mar. 5, 2016, 5 pages.

*Primary Examiner* — Joseph Dallo
*Assistant Examiner* — Anthony L Bacon
(74) *Attorney, Agent, or Firm* — Stetina Brunda Garred and Brucker

(57) ABSTRACT

A system for detecting a leakage/failure in in an intake line of an internal combustion engine comprising an intake line (IL) and an exhaust line (EL), means (HFM) for measuring or for estimating a quantity of fresh air ($\dot{m}_{HFM}$) entering said intake line (IL), means for measuring or for estimating a quantity of fuel ($\dot{m}_{FUEL}$) injected in the engine (E), measurement or estimation means ($\lambda$ and/or NOx), on the exhaust line, adapted to provide a first value ($\lambda_{measured}$) of an air/fuel ratio introduced in the internal combustion engine (E), the system comprising processing means (ECU) adapted to calculate a second value ($\lambda_{exp}$) of said air/fuel ratio, calculated on the basis of the measured and estimated quantities of fresh air ($\dot{m}_{HFM}$) and fuel ($\dot{m}_{FUEL}$) to calculate an error ($\lambda_{err}$) between the first and the second value ($\lambda_{measured}-\lambda_{exp}$) and to detect a condition of leakage/failure if said error is outside a predefined interval [$\lambda_{err}-, \lambda_{err}+$] containing the value zero.

22 Claims, 3 Drawing Sheets

(51) Int. Cl.
*F02D 41/14* (2006.01)
*F02M 26/06* (2016.01)
*F02M 26/49* (2016.01)
*G01M 15/05* (2006.01)
*G01M 15/09* (2006.01)
*F02M 35/10* (2006.01)

(52) U.S. Cl.
CPC ....... *F02D 41/0072* (2013.01); *F02D 41/146* (2013.01); *F02D 41/1456* (2013.01); *F02D 41/18* (2013.01); *F02M 26/06* (2016.02); *F02M 26/49* (2016.02); *G01M 15/05* (2013.01); *G01M 15/09* (2013.01); *F02D 41/0007* (2013.01); *F02D 2200/0614* (2013.01); *F02M 35/10386* (2013.01); *Y02T 10/47* (2013.01)

(56) References Cited

U.S. PATENT DOCUMENTS

| | | | |
|---|---|---|---|
| 6,988,494 B2 | 1/2006 | Hassdenteufel et al. | |
| 2002/0088438 A1* | 7/2002 | Pfitz | F02D 41/0007 123/479 |
| 2004/0210379 A1* | 10/2004 | Kirschke | F02D 41/22 701/114 |
| 2005/0161029 A1* | 7/2005 | Ishikawa | F02D 41/0065 123/568.16 |
| 2006/0207579 A1* | 9/2006 | Tsuda | F02D 41/0055 123/568.16 |
| 2012/0143459 A1 | 6/2012 | Ryu et al. | |
| 2013/0073179 A1 | 3/2013 | Song et al. | |
| 2013/0145831 A1 | 6/2013 | Nam | |

* cited by examiner

SYSTEM FOR DETECTING A LEAKAGE IN AN INTAKE LINE OF AN INTERNAL COMBUSTION ENGINE

CROSS REFERENCE TO RELATED APPLICATIONS

The present application claims priority to Italian Patent Application No. MI2013A001571 filed Sep. 24, 2013, the entirety of the disclosures of which are expressly incorporated herein by reference.

STATEMENT RE: FEDERALLY SPONSORED RESEARCH/DEVELOPMENT

Not Applicable.

APPLICATION FIELD OF THE INVENTION

The present invention refers to the field of the internal combustion engines equipped with at least one low-pressure exhaust gas recirculation duct and more precisely to a system for detecting a leakage in an air intake line and/or EGR of an internal combustion engine.

DESCRIPTION OF THE PRIOR ART

The emission regulations for internal combustion engines require stricter and stricter emission limits and more and more demanding homologation cycles. One of the pollutants which has the highest impact and which the regulations require to keep under control is Nitrogen Oxide (NOx): the EGR (Exhaust Gas Recirculation) is the system in charge of, in most applications, the reduction of such pollutant.

A possible failure lies in the intake of fresh air in the low-pressure EGR duct. In other words, fresh air is introduced instead of recirculating exhaust gas. Thus, on the one hand, the performance, in terms of power/torque delivered by the internal combustion engine, improves, but on the other hand, it is no longer possible to properly control/limit the NOx emissions.

Such type of failure may occur essentially for two reasons: an accidental breaking of the low-pressure EGR duct or a deliberate opening performed by the driver, in order to increase the performance of the internal combustion engine.

Another anomalous conditions that may occur is provoked by a damage of the intake duct, for example due to a cracking.

US20120143459 shows a method to detect possible leakages in a low-pressure EGR system. The present description will include in the following a direct comparison between such method and the present invention.

SUMMARY OF THE INVENTION

Therefore the aim of the present invention is to provide a system that is able to monitor the possible intake of fresh air in/through the low-pressure EGR duct and/or in an intake line of an internal combustion engine, preferably supercharged.

The object of the present invention is a system for detecting a leakage in an intake line of an internal combustion engine.

"Intake line" has to be intended as any duct connected with the intake manifold of an internal combustion engine, including the portions of the recirculation branches EGR downstream of the respective valves—according to the circulation direction of the exhaust gases—, the respective EGR valves and including superchargers, possibly present if the scheme is supercharged.

Advantageously, according to the present invention, it is possible, depending on the type of scheme implemented, to identify one or more segments affected by the leakage.

An internal combustion engine comprising the aforementioned system, a vehicle or a fixed apparatus implementing the aforementioned system are also object of the present invention.

Another object of the present invention is a method for detecting a leakage in an intake line of an internal combustion engine.

The claims describe preferred alternative embodiments of the invention, and are an integral part of the present description.

BRIEF DESCRIPTION OF THE FIGURES

Further purposes and advantages of the present invention will become clear from the following detailed description of a preferred embodiment (and of its alternative embodiments) and the drawings that are attached hereto, which are merely illustrative and non-limitative, in which.

In the figures the same reference numbers and letters identify the same elements or components.

DETAILED DESCRIPTION OF PREFERRED EMBODIMENTS OF THE INVENTION

Figure 1:
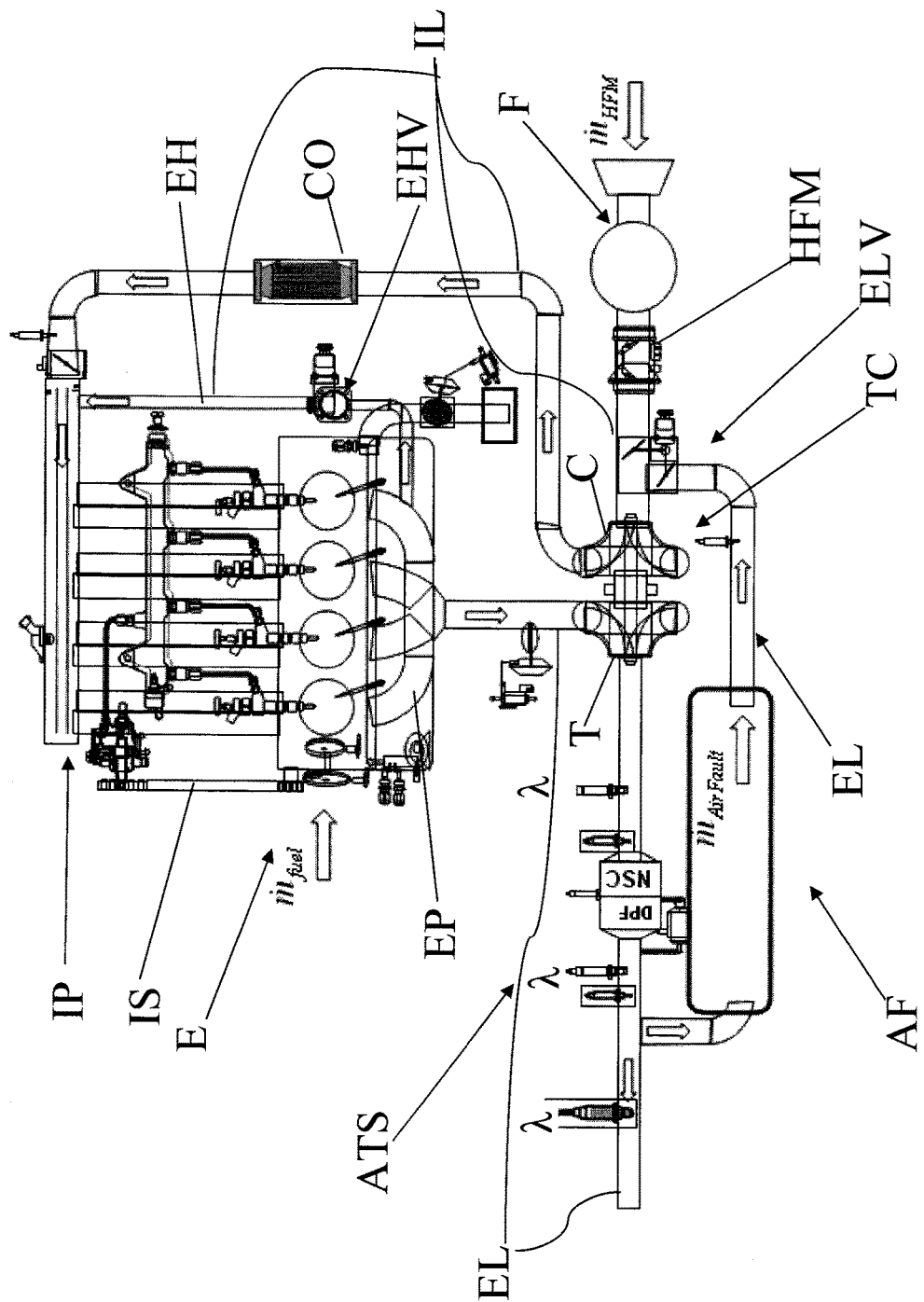
FIG. 1 shows a general diagram of an internal combustion engine comprising a low-pressure EGR duct wherein the system that is object of present invention is implemented.
Figure 2:
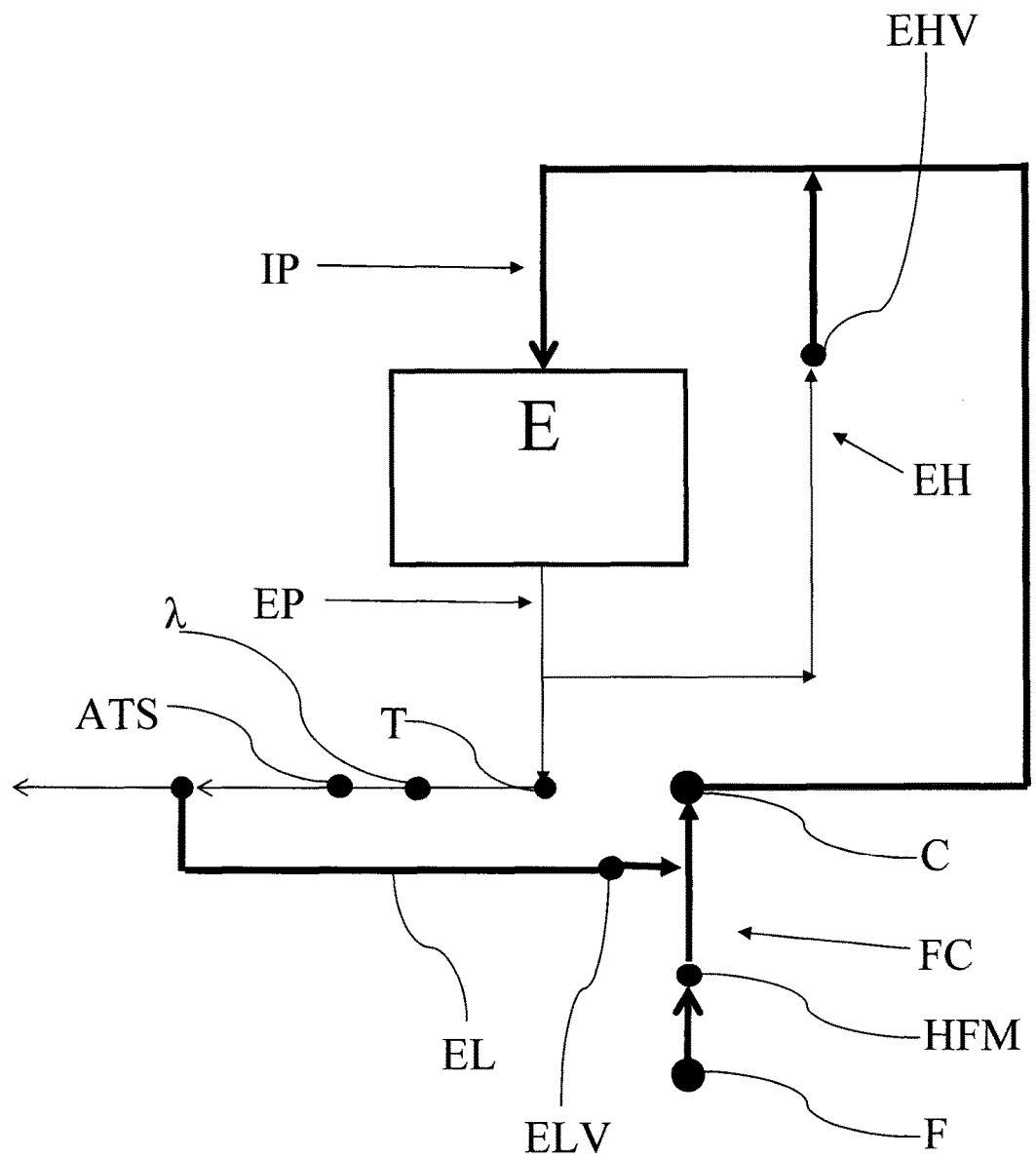
FIG. 2 shows an illustrative scheme comprising both a low-pressure EGR duct and a high-pressure EGR duct, wherein each portion of the different ducts is numbered.

With reference to FIGS. 1 and 2, an internal combustion engine E, preferably of the diesel cycle type, with any number of cylinders, for example 4 or 6, is equipped with an intake manifold IP connected with the outlet of the supercharger or a turbo-supercharging unit TC. The inlet of such supercharger C is connected to the intake filter box F through the duct FC.

Between the intake filter box F and the connection point between the duct EL and the duct FC, a mass flow measuring device (HFM) is arranged, generally present on the internal combustion engines.

As it will be clear in the following, the presence of the turbo-supercharger unit is optional.

The inlet of the turbine T of the same unit TC is connected to the exhaust manifold EP and the outlet is connected to an exhaust gas post-treatment system ATS.

A low-pressure EGR duct EL is connected between the outlet of the turbine T or the exhaust gas treatment system (ATS) and the inlet of the supercharger C. A valve ELV is arranged on any point of such duct EL, for example on the outlet point of the duct FC, to regulate the quantity of exhaust gas to be recirculated.

For the purposes of the present invention, a low-pressure EGR duct can be also an EGR duct of an aspirated engine, namely without supercharging units.

The concept of low pressure, in this context, is clear in relation to the fact that exhaust gas are withdrawn downstream of the turbine T.

The internal combustion engine, if supercharged, can be optionally equipped with a high-pressure EGR duct EH, connected between the exhaust manifold EP and the intake manifold IP, thus upstream of the inlet of the turbine T and downstream of the outlet of the supercharger C. A regulation valve EHV is arranged in any point of such duct EH, for example in the outlet point of such duct in the intake manifold IP, or in the connection point between such duct EH and the exhaust manifold EP, to regulate the quantity of high-pressure EGR gas to be recirculated.

In FIG. 1, the low-pressure recirculation duct EL is shown as interrupted by the superimposition of a block AF having the label $\dot{m}_{AirFault}$ which ideally represents a leakage on the low-pressure EGR duct EL which allows the intake of fresh air in the engine E through the low-pressure EGR valve ELV. Such fresh air is not taken into account by the device for measuring the mass flow (HFM).

As it will be made clear in the following, the intake of fresh air may take place also along the duct FC comprised between the device for measuring the mass flow (HFM) and the inlet of the supercharger C if present, or in any point downstream of the device for measuring the mass flow (HFM) in case the engine is not equipped with any supercharger.

The engine E is also equipped with a fuel injection system IS (not shown in FIG. 2) which comprises means for measuring or for estimating the quantity of fuel injected in the cylinders.

In FIG. 2, the thick lines identify the portions of the intake line to which the present invention is applied. It is immediately evident that for the low-pressure EGR duct it is possible to detect a leakage also upstream of the respective ELV valve, when the valve is open and the pressure in the respective EGR EL is lower than the atmospheric pressure.

Furthermore, the engine is equipped with at least one lambda sensor ($\lambda$) or with a NOx sensor on the exhaust line, through which it is possible to measure the ratio between the (fresh) air and the fuel introduced in the internal combustion engine E.

FIG. 1 shows more lambda sensors, since, in the embodiment shown, they are arranged along the exhaust line, namely along the ATS, of the engine. For the present invention, at least one lambda and/or NOx sensor is enough to realize the invention.

It has to be considered that the symbol $\lambda$ (lambda) indicates the lambda or NOx sensor itself.

According to the present invention, an error $\lambda_{err}$ is estimated making a difference between the lambda measured $\lambda_{measured}$ along the exhaust line by means of said $\lambda$ or NOx sensor and the lambda estimated or measured $\lambda_{exp}$ using the means for measuring or estimating the quantity of fresh air sucked $\dot{m}_{HFM}$ and of fuel injected $\dot{m}_{FUEL}$:

$$\lambda_{err} = \lambda_{measured} - \lambda_{exp}$$

$$\lambda_{exp} = \frac{\dot{m}_{HFM} / \dot{m}_{FUEL}}{STK}$$

STK represents a variable that is generally equal to 14.6 for the diesel, to 13.5 for the biodiesel, to 10.1 for the ethanol and 17.4 for the natural gas. According to the present invention, small values of $\lambda_{err}$, lower than 10%, are to be considered as admissible. However, the treatment has to be considered as extended to the more general cases of engines that require stricter or wider operating tolerances.

When the error, namely $\lambda_{err}$, exceeds a first positive threshold $\lambda_{err}+$, it indicates that the real lambda is higher than the one estimated by means of also the sensor HFM, since further fresh air—not calculated—is introduced in the engine by means of the intake/EGR line.

Thus the internal combustion engine works with an excess of air with respect to the nominal quantity set at the planning stage, and this implies higher NOx emissions.

As explained above, such leakage may occur between the HFM sensor and the inlet of the supercharger C if present, or between the HFM sensor and the intake manifold IP if the engine is not supercharged, or in the portion of low-pressure recirculation duct EL or between the ELV valve and the FC duct (FIG. 2).

According to a preferred alternative embodiment of the present invention, when, on the contrary, the error exceeds a second negative threshold $\lambda_{err}-$, this means that the engine is running with less air than what was set at the planning stage, which implies a higher particulate and/or carbon monoxide and/or unburned hydrocarbon emission.

Such condition may occur when the engine is supercharged for a leakage of the intake duct between the outlet of the supercharger C and the intake manifold IP, or between the intake manifold IP and the EGR valve (EHV), or in the low-pressure EGR line EL if the valve ELV is not closed and at the same time the pressure of the EGR line is higher than the atmospheric one.

Thus the present invention can be implemented to detect leakages that make the internal combustion engine work with an excess or a lack of air with respect to the nominal value set at the planning stage.

The system according to the present invention can be adapted to detect both types of failure, even though they are not concomitant.

At the basis of the present invention there is the calculation of the aforementioned error between the lambda measured on the exhaust line and the lambda estimated/measured on the basis of the quantity of air and fuel entering the engine.

According to a preferred alternative embodiment of the invention both the first positive threshold $\lambda_{err}+$ and the second negative threshold $\lambda_{err}-$ have the same absolute value and preferably comprised between 0.1 and 0.3 with an optimal value of 0.2. Such values are not binding, but are connected to the current state of the art and to the regulations on emissions in force, and thus the treatment has to be considered as extended to wider or stricter tolerance values.

According to a preferred alternative embodiment of the invention, between the outlet of the turbine and the inlet of the low-pressure EGR duct EL, a device for the reduction of pollutant emissions, such as a DPF (Diesel Particulate Filter) and/or un SCR (Selective Catalytic Reduction) or, as an alternative to the SCR, a NSC (NOx storage catalyst) may be arranged.

In order to keep the present method reliable it is preferable that the inhibition means thereof are activated as soon as heating strategies of the ATS and/or regeneration strategies of the DPF are activated.

Anyway it is preferable that the lambda or NOx sensor is arranged upstream of the ATS so that it is not affected by possible variations in the oxygen content it can introduce. A comparison between the present invention and US20120143459 will now be presented.

'US20120143459 describes a method wherein a parameter Leak_Air is calculated on the basis of the ratio between the air/fuel ratio measured and the lambda value measured at the exhaust $\lambda_{measured}$ and it is compared with an arbitrary threshold Leak_Air_Det: the error is detected if Leak_Air>Leak_Air_Det occurs regularly, or if in average in a certain time interval Leak_Air>Leak_Air_Inter, the latter being generally different from Leak_Air_Det. As a consequence of the aforementioned formula, the method proposed by US20120143459 can be effective only in predicting leakages resulting in a gas leak (air or air and recirculated exhaust gas) towards the outside, such as for example in the segment of the air/EGR intake line downstream of the supercharger, namely with a high pressure, or in the segment of the low-pressure EGR line EL when the low-pressure EGR valve is not closed and in such segment there are pressure conditions higher then the atmospheric pressure. On the contrary, it generally cannot predict leakages resulting in an intake of air from outside, such as for example in the segment of the air/EGR intake line comprised between the mass flow sensor (HFM) and the supercharger C or on the low-pressure EGR line EL, see FIG. 2.

The air/fuel ratio is determined according to the quantity of air measured at the intake divided by the fuel injected and by an "air/fuel ratio theoretical value".

For a more convenient comparison, for the air fuel ratio calculated according to US20120143459, the same symbol used according to the present invention $\lambda_{exp}$ is used. Leak_Air is thus equal to $\lambda_{measured}/\lambda_{exp}$.

According to the present invention there is no failure/leakage to be signalled when $\lambda_{err}=\lambda_{measured}-\lambda_{exp}\cong 0$, namely it is comprised between the threshold $\lambda_{err}-$ and $\lambda_{err}+$ and vice versa, there is a failure/leakage to be signalled when said error is not comprised between the aforementioned thresholds.

When measured $\lambda_{measured}\cong\lambda_{exp}$, then there is not leakage and Leak_Air should be approximately equal to 1.

An $\lambda_{err}<0$ according to the present invention implies that Leak_Air>1 and, analogously, an error $\lambda_{err}>0$ according to the present invention implies 0<Leak_air<1.

US20120143459 gives no indication about the value of Leak_Air_Det, thus it is possible to choose any value $-\infty<$Leak_Air_Det<1, for example Leak_air_Det=0.8, in this way the method would detect a leakage also in absence of real leakages/failures with Leak_air=1, namely in the case in which, according to the present invention, the expected lambda coincides exactly with the measured lambda.

Thus the teaching of US20120143459 is at least incomplete.

According to another alternative embodiment of the invention, the intake line between the outlet of the supercharger and the intake manifold IP may comprise an intercooler CO (FIG. 1). Analogously, each one of the recirculation ducts may comprise a cooler of the recirculated gas.

Thus, according to the present invention, it is possible to detect possible leakages by means of such coolers.

The system as described above allows to actuate a control of the continuous type of the sealing conditions both of the low-pressure EGR duct and of the intake line.

Figure 3:
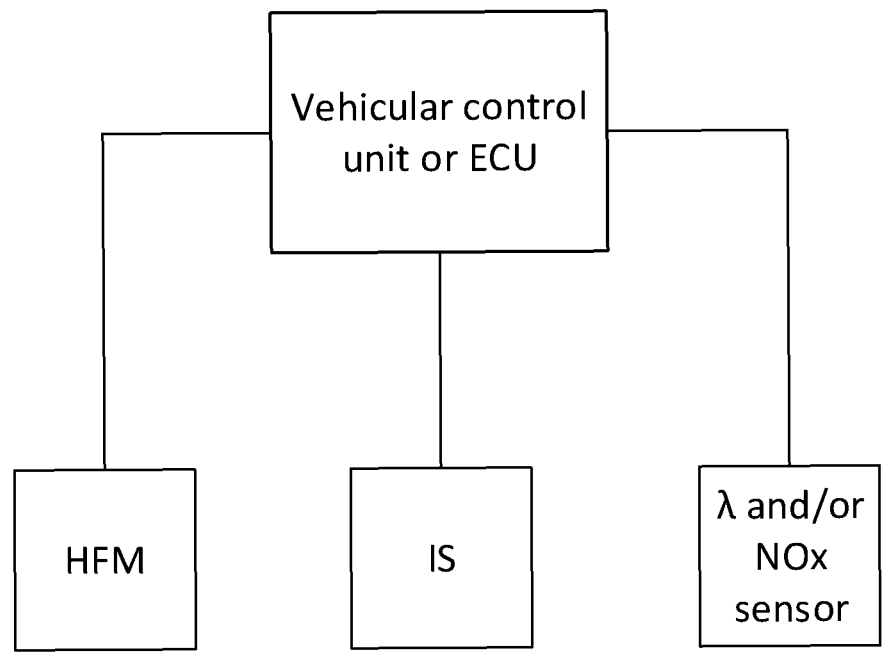
FIG. 3 shows a vehicular control unit or engine control unit ECU in communication with a mass flow measuring device HFM, a fuel injection system IS, and a lambda sensor $\lambda$ and/or NOx sensor.

Such monitoring can be performed by a vehicular control unit or by the engine control unit ECU as shown in FIG. 3. Thus, the present invention may advantageously be realized by means of a computer program, which comprises program code means performing one or more steps of said method, when said program is run on a computer. For this reason the scope of the present patent is meant to cover also said computer program and the computer-readable means that comprise a recorded message, such computer-readable means comprising the program code means for performing one or more steps of such method, when such program is run on a computer.

It will be apparent to the person skilled in the art that other alternative and equivalent embodiments of the invention can be conceived and reduced to practice without departing from the scope of the invention.

For example, the detection of one of the possible types of failures may determine the signalling of an anomaly by means of a light on the dashboard of the vehicle and/or may determine the activation of a recovery procedure which limits the maximum torque and/or the maximum power that can be delivered by the internal combustion engine E or the maximum speed of the vehicle where the present invention is implemented.

From the description set forth above it will be possible for the person skilled in the art to embody the invention with no need of describing further construction details. The elements and the characteristics described in the different preferred embodiments may be combined without departing from the scope of the present application. What is described in the description of the prior art, if not explicitly excluded in the detailed description, has to be considered in combination with the characteristics of the present invention, forming an integral part of the present invention.

The invention claimed is:

1. A system for detecting a leakage/failure in an intake line of an internal combustion engine comprising
    an intake line (IL) and an exhaust line (EL),
    means (HFM) for measuring or for estimating a quantity of fresh air ($\dot{m}_{HFM}$) entering said intake line (IL),
    a fuel injection system for measuring or for estimating a quantity of fuel ($\dot{m}_{FUEL}$) injected into the engine,
    measurement or estimation means ($\lambda$ and/or NOx), on said exhaust line, adapted to provide a first value ($\lambda_{measured}$) of an air/fuel ratio introduced in the internal combustion engine (E), the system comprising processing means (ECU) configured to calculate a second value ($\lambda_{exp}$) of said air/fuel ratio, calculated on the basis of said measured or estimated quantities of fresh air ($\dot{m}_{HFM}$) and fuel ($\dot{m}_{FUEL}$) injected into the engine (E), to calculate an error ($\lambda_{err}$) as the difference between said first and second value of air/fuel ratio ($\lambda_{measured}-\lambda_{exp}$) and to detect a condition of leakage/failure if said error exceeds positively a predefined interval [$\lambda_{err}-$, $\lambda_{err}+$] containing the value zero and detect a condition of leakage/failure if said error exceeds negatively said predefined interval [$\lambda_{err}-$, $\lambda_{err}+$].

2. System according to claim 1, wherein when said engine is supercharged by means of a supercharger (C) and comprises low-pressure and/or high-pressure recirculation means,
    when said error ($\lambda_{err}$) exceeds positively said predefined interval [$\lambda_{err}-$, $\lambda_{err}+$], said processing means (ECU) are configured to generate a warning message indicating
        a leakage in a duct comprised between said means for measuring or estimating a quantity of fresh air ($\dot{m}_{HFM}$) entering the engine (E) and an inlet of said supercharger (C) and/or
        a leakage in a portion of a low-pressure recirculation EGR duct (EL) or in a portion of duct comprised between a respective low-pressure EGR valve (ELV) and said inlet of said supercharger (C);
    or
    when said error ($\lambda_{err}$) exceeds negatively said predefined interval ([$\lambda_{err}-$, $\lambda_{err}+$]), said processing means (ECU) are adapted to generate a warning message indicating a leakage in a duct comprised between an outlet of said supercharger (C) and an intake manifold (IP) of the engine and/or a leakage in a high-pressure recirculation EGR duct comprised between a respective EGR valve (EHV) and said intake manifold (IP) and/or a leakage in a low-pressure EGR line (EL) when a respective EGR valve (ELV) is not completely closed and at the same time the EGR line is at a pressure higher than the atmospheric pressure.

3. System according to claim 1, wherein said engine is not supercharged and comprises recirculation means EGR, when said error ($\lambda_{err}$) exceeds positively said predefined interval ([$\lambda_{err}-$, $\lambda_{err}+$]), said processing means (ECU) are adapted to generate a warning message indicating a leakage in a duct comprised between said means for measuring or estimating a quantity of fresh air ($\dot{m}_{HFM}$) entering the engine (E) and an intake manifold of the engine and/or a leakage in a portion of a low-pressure recirculation EGR duct (EL) or in a portion of duct comprised between a respective low-pressure EGR valve (ELV) and intake manifold (IP);

or when said error ($\lambda_{err}$) exceeds negatively said predefined interval ([$\lambda_{err}-$, $\lambda_{err}+$]), said processing means (ECU) are adapted to generate a warning message indicating a leakage in a low-pressure EGR line (EL) when a respective low-pressure EGR valve (ELV) is not closed and the EGR line is at a pressure higher than the atmospheric pressure.

4. System according to claim 1, wherein $\lambda_{err}-$ and $\lambda_{err}+$ have an absolute value comprised between 0.1 and 0.3, so that, in a "normal" condition, wherein there is no leakage/failure, $\lambda_{err}-<\lambda_{err}<\lambda_{err}+$ results.

5. System according to claim 4, wherein said thresholds $\lambda_{err}-$ and $\lambda_{err}+$ have an absolute value equal to 0.2.

6. Internal combustion engine (E) comprising:
the system according to claim 1; and
one or more cylinders, wherein said fuel injection system is for measuring or for estimating a quantity of fuel ($\dot{m}_{FUEL}$) injected into said one or more cylinders.

7. Engine according to claim 6, further comprising a supercharger (C) arranged on said intake line (IL) and low-pressure and/or high-pressure recirculation means EGR, and wherein said processing means are configured to detect a leakage/failure when said error ($\lambda_{err}$) exceeds positively said predefined interval [$\lambda_{err}-$, $\lambda_{err}+$], indicating a leakage in a duct comprised between said means for measuring or estimating a quantity of fresh air ($\dot{m}_{HFM}$) entering the engine (E) and an inlet of said compressor (C) and/or a leakage in a portion of a low-pressure recirculation EGR duct (EL) or in a portion of duct comprised between a respective low-pressure EGR valve (ELV) and said inlet of said supercharger (C);

or when said error ($\lambda_{err}$) exceeds negatively said predefined interval [$\lambda_{err}-$, $\lambda_{err}+$], indicating a leakage in a duct comprised between an outlet of said supercharger (C) and an intake manifold (IP) of the engine and/or a leakage in a high-pressure recirculation EGR duct comprised between a respective EGR valve (EHV) and said intake manifold (IP) and/or a leakage in a low-pressure EGR line (EL) when a respective EGR valve (ELV) is not completely closed and at the same time the EGR line is at a pressure higher than the atmospheric pressure.

8. Engine according to claim 6, being of the type non supercharged and comprising recirculation means EGR, and wherein said processing means are configured to detect a leakage/failure when said error ($\lambda_{err}$) exceeds positively said predefined interval [$\lambda_{err}-$, $\lambda_{err}+$], said processing means (ECU) are adapted to generate a warning message indicating a leakage in a duct comprised between said means (HFM) for measuring or estimating a quantity of fresh air ($\dot{m}_{HFM}$) entering the engine (E) and an intake manifold (IP) of the engine and/or a leakage in a portion of a low-pressure recirculation EGR duct (EL) or in a portion of duct comprised between a respective low-pressure EGR valve (ELV) and said intake manifold (IP);

or when said error ($\lambda_{err}$) exceeds negatively said predefined interval [$\lambda_{err}-$, $\lambda_{err}+$], said processing means (ECU) are adapted to generate a warning message indicating a leakage in a low-pressure EGR line (EL) when a respective low-pressure EGR valve (ELV) is not closed and the EGR line is at a pressure higher than the atmospheric pressure.

9. Engine according to claim 6, wherein $\lambda_{err}-$ and $\lambda_{err}+$ have an absolute value comprised between 0.1 and 0.3, so that, in a "normal" condition, wherein there is no leakage/failure, $\lambda_{err}-<\lambda_{err}<\lambda_{err}+$ results.

10. Engine according to claim 9, wherein said thresholds have an absolute value equal to 0.2.

11. Engine according to claim 6, further comprising an intercooler (C) on the intake line (IL) and/or a cooler on a recirculation duct EGR.

12. Engine according to claim 6, further comprising an anti-pollution device (DPF, SCR, NSC) on the exhaust line (EL).

13. Vehicle or fixed apparatus comprising the internal combustion engine according to claim 6.

14. Method for detecting a leakage in an intake line (IL) of an internal combustion engine comprising an intake line (IL) and an exhaust line (EL), means (HFM) for measuring or for estimating a quantity of fresh air ($\dot{m}_{HFM}$) entering said intake line (IL), a fuel injection system for measuring or for estimating a quantity of fuel ($\dot{m}_{FUEL}$) injected into the engine (E), measurement or estimation means ($\lambda$ and/or NOx), on said exhaust line, the method comprising the steps of:

calculation of a first value ($\lambda_{measured}$) of a air/fuel ratio introduced in the engine (E) through said measurement or estimation means ($\lambda$ and/or NOx) on said exhaust line calculating a second value ($\lambda_{exp}$) of air/fuel ratio entering the engine on the basis of said measured or estimated quantities of fresh air ($\dot{m}_{HFM}$) and fuel ($\dot{m}_{FUEL}$) entering the engine and calculating an error ($\lambda_{err}$) making the difference between said first value and said second value ($\lambda_{measured}-\lambda_{exp}$) and detecting a condition of leakage/failure if said error ($\lambda_{err}$) exceeds positively a predefined interval [$\lambda_{err}-$, $\lambda_{err}+$] containing the value zero and detecting a condition if leakage/failure if said error ($\lambda_{err}$) exceeds negatively said predefined interval [$\lambda_{err}-$, $\lambda_{err}+$].

15. Method according to claim 14, wherein said engine is supercharged by means of a supercharger (C) arranged on said intake line (IL) and provided with low-pressure and/or high-pressure recirculation means EGR, the method comprising a step of signalling a leakage/failure when said error ($\lambda_{err}$) exceeds positively said predefined interval [$\lambda_{err}-$, $\lambda_{err}+$], indicating a leakage in a duct comprised between said means for measuring or estimating a quantity of fresh air ($\dot{m}_{HFM}$) entering the engine (E) and an inlet of said compressor (C) and/or a leakage in a portion of a low-pressure recirculation EGR duct (EL) or in a portion of duct comprised between a respective low-pressure EGR valve (ELV) and said inlet of said supercharger (C);

or when said error ($\lambda_{err}$) exceeds negatively said predefined interval [$\lambda_{err}-$, $\lambda_{err}+$], indicating a leakage in a duct comprised between an outlet of said supercharger (C) and an intake manifold (IP) of the engine and/or a leakage in a high-pressure recirculation EGR duct comprised between a respective EGR valve (EHV) and said intake manifold (IP) and/or a leakage in a low-pressure EGR line (EL) when a respective EGR valve (ELV) is not completely closed and at the same time the EGR line is at a pressure higher than the atmospheric pressure.

16. Method according to claim 14, wherein said engine is not supercharged and comprises recirculation means EGR, the method comprising a step of signalling a leakage/failure when said error ($\lambda_{err}$) exceeds positively said predefined interval [$\lambda_{err}-$, $\lambda_{err}+$], indicating a leakage in a duct comprised between said means for measuring or estimating a quantity of fresh air ($\dot{m}_{HFM}$) entering the engine (E) and an intake manifold of the engine and/or a leakage in a portion of a low-pressure recirculation EGR duct (EL) or in a portion of duct comprised between a respective low-pressure EGR valve (ELV) and said inlet of said supercharger (C);

or when said error ($\lambda_{err}$) exceeds negatively said predefined interval [$\lambda_{err}+$, $\lambda_{err}+$], indicating a leakage in a low-pressure EGR line EL when the valve ELV is not closed and at the same time the EGR line is at a pressure higher than the atmospheric pressure.

17. Method according to claim 14, wherein $\lambda_{err}-$ and $\lambda_{err}+$ have an absolute value comprised between 0.1 and 0.3, so that, in a "normal" condition, wherein there is no leakage/failure, $\lambda_{err}-<\lambda_{err}<\lambda_{err}+$ results.

18. Method according to claim 17, wherein said thresholds $\lambda_{err}-$ and $\lambda_{err}+$ have an absolute value equal to 0.2.

19. System according to claim 1, wherein said processing means (ECU) are configured to activate a recovery procedure when said error ($\lambda_{err}$) is outside the predefined interval [$\lambda_{err}-$, $\lambda_{err}+$].

20. System according to claim 19, wherein the recovery procedure limits a maximum torque and/or a maximum power that can be delivered by the internal combustion engine or a maximum speed of a vehicle comprising the internal combustion engine.

21. Method according to claim 14, further comprising activating a recovery procedure when said error ($\lambda_{err}$) is outside the predefined interval [$\lambda_{err}-$, $\lambda_{err}+$].

22. Method according to claim 19, wherein the recovery procedure limits a maximum torque and/or a maximum power that can be delivered by the internal combustion engine or a maximum speed of a vehicle comprising the internal combustion engine.

* * * * *